US012695378B2

(12) United States Patent
Agarwal et al.

(10) Patent No.: US 12,695,378 B2
(45) Date of Patent: Jul. 28, 2026

(54) PRECHARGING DC LINK BETWEEN BATTERY AND POWER CONNECTION

(71) Applicant: Aptiv Technologies AG, Schaffhausen (CH)

(72) Inventors: Rachit Agarwal, Troy, MI (US); Sumit Dutta, Rochester Hills, MI (US)

(73) Assignee: Aptiv Technologies AG, Schaffhausen (CH)

( * ) Notice: Subject to any disclaimer, the term of this patent is extended or adjusted under 35 U.S.C. 154(b) by 232 days.

(21) Appl. No.: 18/403,935

(22) Filed: Jan. 4, 2024

(65) Prior Publication Data

US 2025/0226741 A1     Jul. 10, 2025

(51) Int. Cl.
H02M 3/335          (2006.01)
H02J 7/00           (2006.01)
(Continued)

(52) U.S. Cl.
CPC ............. *H02M 1/4233* (2013.01); *H02J 7/02* (2013.01); *H02J 7/865* (2026.01);
(Continued)

(58) Field of Classification Search
CPC .... H02M 1/4233; H02M 1/42; H02M 1/4208; H02M 1/1225; H02M 1/4241; H02M 1/425; H02M 1/4258; H02M 1/4266; H02M 1/0043; H02M 3/33573; H02M 3/33576; H02M 3/33584; H02M 3/33592; H02M 3/335; H02M 3/33523; H02M 3/33546; H02M 3/33569; H02M 3/01;
(Continued)

(56) References Cited

U.S. PATENT DOCUMENTS 9,341,665 B2      5/2016  Kaminski et al.
10,804,812 B1 *  10/2020  Dehem ............. H02M 3/33571
(Continued)

OTHER PUBLICATIONS

Jiang et al., "A Soft Start Approach of Solid-State Transformer," 2021 IEEE 1st International Power Electronics and Application Symposium (PEAS), Shanghai, China, 2021, pp. 1-6, doi: 10.1109/PEAS53589.2021.9628885.
(Continued)

*Primary Examiner* — Nguyen Tran
(74) *Attorney, Agent, or Firm* — Miller Johnson

(57)          ABSTRACT

A system includes a direct current (DC) link configured to receive DC power from a first converter that converts alternating current power into DC power. A bidirectional DC-DC converter, electrically connected between the DC link and a DC power source, is configured to convert DC power from a first voltage to a second voltage. The bidirectional DC-DC converter includes multiple switches. A controller is configured to control a switching parameter of the plurality of switches to charge the DC link to a threshold voltage from the DC power source before the first converter provides power to the DC power source. The switching parameter is at least one of a switching frequency and a phase shift. Controlling the switching parameter includes initially setting the switching parameter to a first value and, in response to determining that a set of criteria has been met, adjusting the switching parameter to a second value.

17 Claims, 9 Drawing Sheets

(51) Int. Cl.

| | |
|---|---|
| *H02J 7/02* | (2016.01) |
| *H02M 1/00* | (2006.01) |
| *H02M 1/42* | (2007.01) |
| *H02M 3/00* | (2006.01) |
| *H02M 7/5387* | (2007.01) |
| *H02M 7/797* | (2006.01) |
| *B60L 53/60* | (2019.01) |

(52) U.S. Cl.
CPC ........... *H02M 1/0043* (2021.05); *H02M 3/01* (2021.05); *H02M 3/33573* (2021.05); *H02M 3/33584* (2013.01); *H02M 7/53871* (2013.01); *H02M 7/797* (2013.01); *B60L 53/60* (2019.02); *B60L 2270/20* (2013.01); *H02J 2207/20* (2020.01)

(58) Field of Classification Search
CPC ........... H02M 7/53871; H02M 7/5387; H02M 7/5388; H02M 7/53878; H02M 7/97; H02M 7/08; H02J 7/0068; H02J 7/007; H02J 7/02; H02J 7/04
See application file for complete search history.

(56) References Cited

U.S. PATENT DOCUMENTS

| | | | |
|---|---|---|---|
| 11,349,386 B2 | 5/2022 | Yeo et al. | |
| 2015/0019055 A1* | 1/2015 | Nie | ..................... B60L 58/20 701/22 |
| 2021/0399628 A1* | 12/2021 | Yeo | ..................... H02M 1/36 |
| 2022/0103080 A1* | 3/2022 | Yang | ................... H02M 1/0009 |
| 2024/0213884 A1* | 6/2024 | Wan | ................... H02M 1/0058 |

OTHER PUBLICATIONS

Wang et al., "Full ZVS soft-start of a SiC medium voltage series resonant DC-DC converter using variable frequency variable duty cycle control," 2017 IEEE 3rd International Future Energy Electronics Conference and ECCE Asia (IFEEC 2017—ECCE Asia), Kaohsiung, Taiwan, 2017, pp. 1855-1860, doi: 10.1109/IFEEC. 2017.7992331.

* cited by examiner

PRECHARGING DC LINK BETWEEN BATTERY AND POWER CONNECTION

FIELD

The present disclosure relates to DC-DC power electronics and more particularly to power electronics with integrated energy storage.

BACKGROUND

Modern electric vehicles are commonly propelled by one or more electric motors powered by one or more rechargeable batteries. Vehicle battery charging methods are classified into fast charging schemes, in which a high voltage direct current is directly applied to the battery, and slow charging schemes, in which alternating current (AC) power is supplied to the battery. In some systems, charging the vehicle batteries requires on-board charger circuitry. However, charging the batteries of the vehicle has a possibility of damaging components of an on-board charger due to in-rush current.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a direct current (DC) link configured to receive DC power from a first converter that converts alternating current power into DC power. A bidirectional DC-DC converter, electrically connected between the DC link and a DC power source, is configured to convert DC power from a first voltage to a second voltage. The bidirectional DC-DC converter includes multiple switches. A controller is configured to control a switching parameter of the plurality of switches to charge the DC link to a threshold voltage from the DC power source before the first converter provides power to the DC power source. The switching parameter is at least one of a switching frequency and a phase shift. Controlling the switching parameter includes initially setting the switching parameter to a first value and, in response to determining that a set of criteria has been met, adjusting the switching parameter to a second value.

In other features, the switching parameter is switching frequency. In other features, switching of a first set of switches of the plurality of switches is phased shifted with respect to switching of a second set of switches of the plurality of switches. A phase shift between the first set of switches and the second set of switches is held constant while the switching frequency is adjusted. In other features, switching of a first set of switches of the plurality of switches is phased shifted with respect to switching of a second set of switches of the plurality of switches. The switching parameter is phase shift between the first set of switches and the second set of switches. In other features, a switching frequency of the plurality of switches is held constant while the phase shift is adjusted.

In other features, the switching parameter is iteratively adjusted by a plurality of increments. In other features, the switching parameter is adjusted monotonically. In other features, a duty cycle of each switch of the plurality of switches remains unchanged while the switching parameter is being adjusted. The duty cycle of each switch of the plurality of switches is equal to each other. In other features, a first group of switches of the plurality of switches has a first duty cycle. A second group of switches of the plurality of switches has a second duty cycle. A sum of the first duty cycle and the second duty cycle is one hundred percent. The first duty cycle and the second duty cycle are held constant while the switching parameter is adjusted.

In other features, the set of criteria includes a criterion that is met by the DC link exceeding a first capacitor voltage. In other features, the set of criteria includes a criterion that is met by a specified first time period elapsing. In other features, the DC power source is configured to, in a reverse operating mode, deliver power to an AC power source. In other features, the system includes a system controller configured to delay provision of power from the first converter to the DC link until the DC link is charged to the threshold voltage. The system controller is configured to selectively charge the DC power source from power provided by the first converter.

In other features, the controller is configured to repeatedly adjust the switching parameter until at least one of a voltage of the DC link reaches a voltage threshold, a time since initially setting the switching parameter to the first value reaches a threshold, or the switching parameter is adjusted to a final switching parameter. In other features, the final switching parameter is determined by indexing a lookup table. The lookup table is indexed by a measured voltage of the DC power source. In other features, the first value is determined by indexing a lookup table. The lookup table is indexed by a measured voltage of the DC power source.

In other features, the system includes the first converter. The first converter is a bidirectional power factor correction (PFC) inverter. In other features, the DC link includes a set of capacitors electrically arranged in parallel. In other features, the bidirectional DC-DC converter includes a set of transformers. A first side of the set of transformers is electrically arranged in series. A second side of the set of transformers is electrically arranged in parallel. The bidirectional DC-DC converter has inductive-capacitive and capacitive-inductive resonance. In other features, the system includes the DC power source, the DC power source includes a battery bank.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Battery electric vehicles (BEV) and hybrid electric vehicles (HEV) have large battery packs that are used in conjunction with an electric motor to provide traction power (propulsion) to the vehicle. To provide sufficient power for propulsion, the battery pack may output a high voltage (for example, greater than 100V, 200V, 600V, 750V, or 1000V). When connecting the battery pack charging circuity to a power source to charge, the initial flood of power can cause high amperage current to flow through the system. This initially high current, known as in-rush current, can be multiple times (for example, four to ten times) the normal operational current. If the in-rush current is not prevented or mitigated, the charging circuitry (which, in some implementations, may be rated for less than one amp of current) can be damaged. Precharging intermediate nodes of the charging circuitry can reduce in-rush current and prevent degradation or damage to circuit components. In some implementations, in-rush current is reduced by precharging a direct current (DC) link capacitor to a high voltage. In some implementations, the DC link capacitor is charged to the same voltage as the current voltage of the vehicle's traction battery. In some implementations, the DC link capacitor is charged to the same voltage as the AC or DC power source.

Block Diagram

Figure 1:
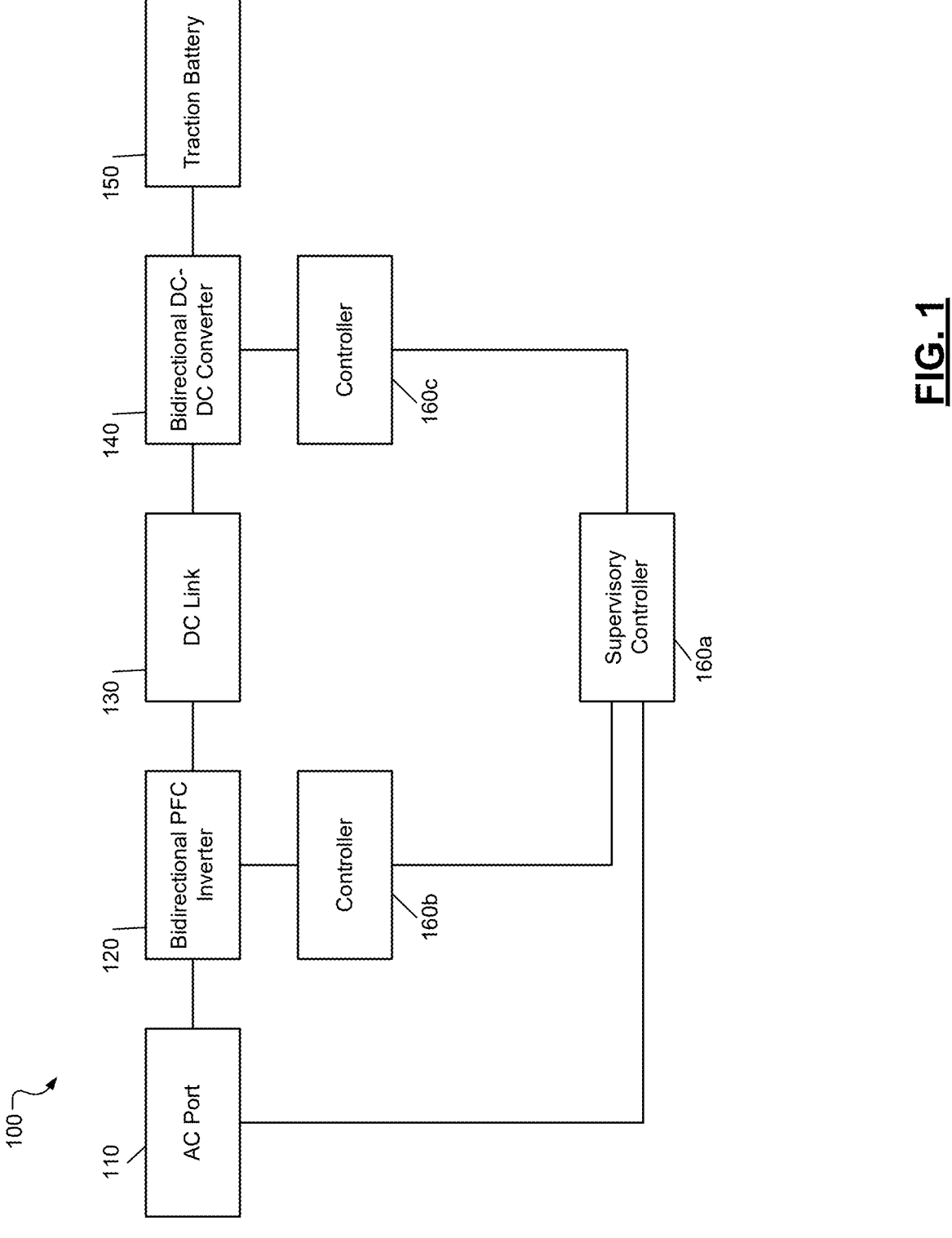
FIG. 1 is a simplified block diagram of an example system including a direct current link, bidirectional DC-DC converter, and a controller.

FIG. 1 is a simplified block diagram of system 100 for charging traction battery 150 from AC port 110. Traction battery 150 may provide energy to one or more electric motors, which propels the vehicle. AC port 110 may be a wall outlet at a residence, a charging port at a charging station, etc.

In various implementations, system 100 may also be capable of charging an AC device connected to AC port 110 from traction battery 150. AC port 110 is connected to bidirectional power factor correction (PFC) inverter 120, which converts AC power to DC power when charging traction battery 150 and DC power to AC power when using traction battery 150 to provide power to AC port 110. Bidirectional PFC inverter 120 is controlled by one or more controllers (for example controller 160b and/or controller 160a).

Controller 160a is a supervisory controller that sends control signals to sub controllers (for example, controller 160b and controller 160c). Controller 160a, controller 160b, and controller 160c control switches inside the components of system 100. For example, in some implementations, controller 160a, controller 160b, and controller 160c control the gates of transistors in system 100.

Bidirectional PFC inverter 120 is connected to DC link 130, which includes a set of capacitors. DC link 130 is connected to bidirectional DC-DC converter 140. Bidirectional DC-DC converter 140 adjusts DC power up or down as needed by traction battery 150. For example, traction battery 150 can be a variable voltage level depending on the state of charge (for example, 380-800 V). Therefore, when charging, the voltage delivered by bidirectional DC-DC converter 140 is modified as needed by controller 160c to meet the needs of traction battery 150. According to the present disclosure, bidirectional DC-DC converter 140 allows charging of the DC link 130 to occur using power from traction battery 150 instead of AC port 110, and eliminates circuitry (for example, limiting resistors and/or relays) that would otherwise be necessary in bidirectional PFC inverter 120.

Circuit Diagram

Figure 2A:
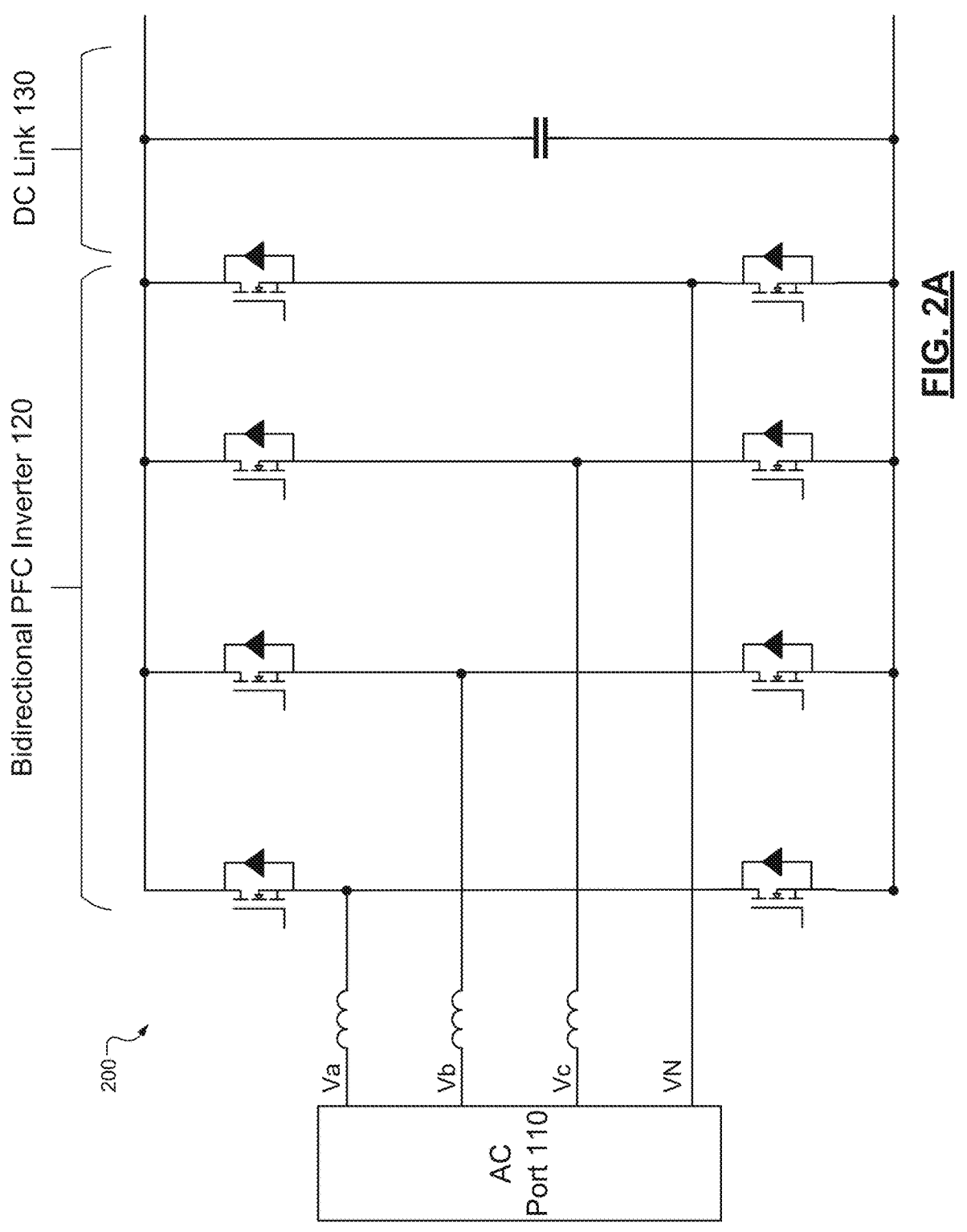
FIGS. 2A-2B together are a simplified circuit diagram according to the principles of the present disclosure.
Figure 2B:
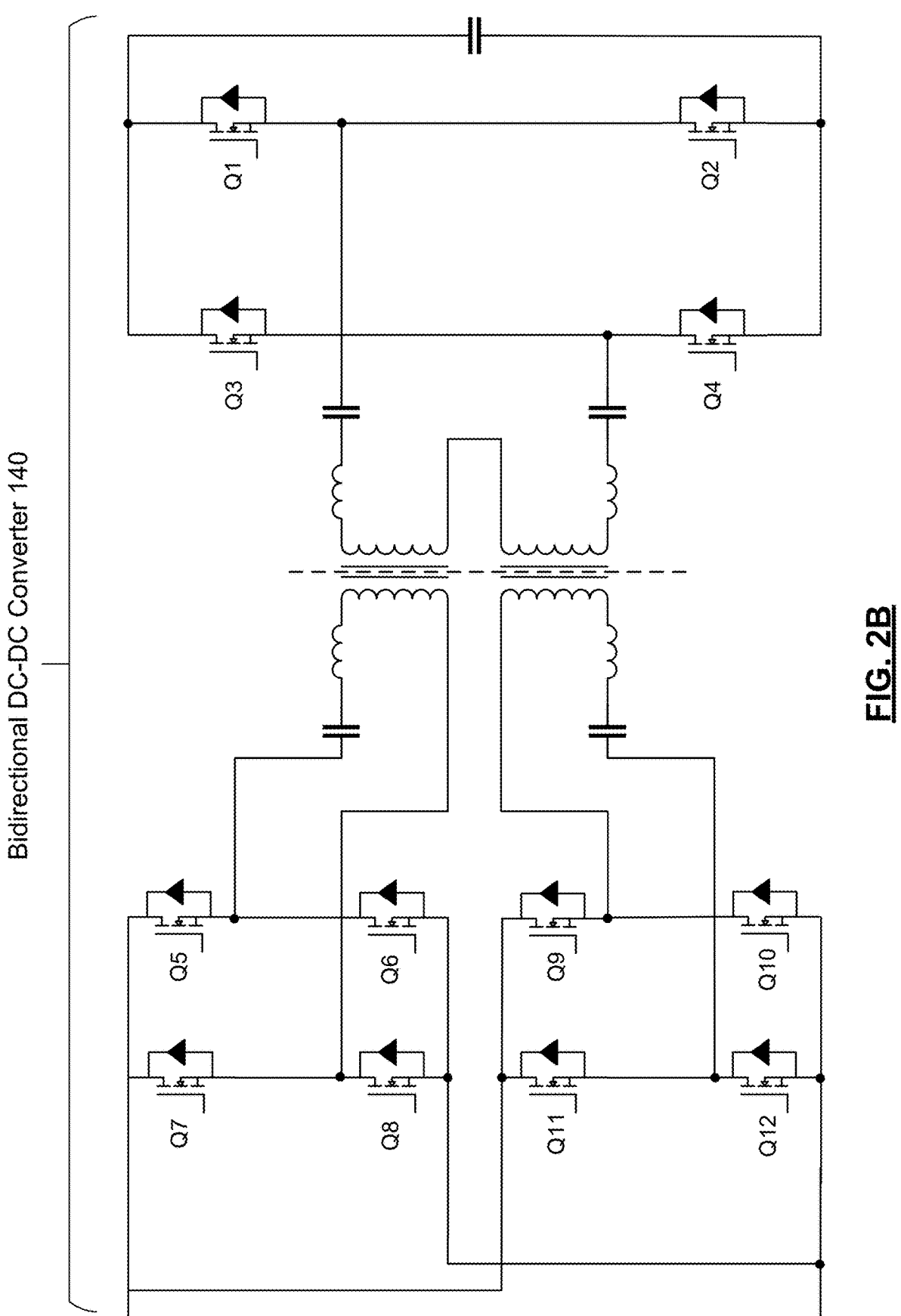

FIGS. 2A and 2B (collectively referred to as FIG. 2) are a simplified circuit diagram of example circuit 200, which corresponds to system 100. Circuit 200 includes AC port 110, bidirectional PFC inverter 120, DC link 130, bidirectional DC-DC converter 140, and traction battery 150. In some implementations, components of circuit 200 include additional wiring and/or components than those shown in FIG. 2, or are connected in series and/or in parallel. For example, in some implementations, some components may include additional resistors, capacitors, diodes, and/or inductors connected in series or in parallel with the depicted components.

In some implementations, bidirectional PFC inverter 120 includes a set of transistors. In some implementations, DC link 130 includes at least one capacitor. In some implementations, bidirectional DC-DC converter 140 includes a set of at least two independent transformers used for adjusting DC power up or down based on the current voltage of traction battery 150. In some implementations, the output power of bidirectional DC-DC converter 140 is stepped up or down from AC port 110 by sensing the present voltage of traction battery 150 and referencing a look-up table. In some implementations, one side of the set of transformers is connected to the other transformer(s) in parallel, and the other side of the set of transformers is connected in series. Bidirectional DC-DC converter 140 also includes transistors on both sides of the transformers, which are controlled (e.g., by controller 160a and/or 160c) to manage the flow of power through bidirectional DC-DC converter 140 (e.g., from traction battery 150 to DC link 130 and/or AC port 110 to traction battery 150). In some implementations, bidirectional DC-DC converter 140 has inductor-capacitor resonance. In some implementations, traction battery 150 is a battery bank made up of at least two batteries. In some implementations, traction battery 150 is a single battery.

Frequency Modulation

Figure 3:
FIGS. 3, 4, and 5A-5B illustrate example control signals applied to a bidirectional DC-DC converter.

FIG. 3 is a voltage diagram for an example method of charging DC link 130. In some implementations, DC link 130 is charged by adjusting a switching frequency of the switches of bidirectional DC-DC converter 140. For example, to charge DC link 130 before providing power to traction battery 150 from AC port 110, traction battery 150 gradually provides power to charge DC link 130. Controller 160a signals controller 160b to begin switching the switches of bidirectional DC-DC converter 140 by setting an initial switching frequency for the switches of bidirectional DC-DC converter 140. The switching frequency may then be adjusted monotonically.

In some implementations, the initial switching frequency is a higher frequency that is then lowered until DC link 130 is charged. In some implementations, the initial switching frequency is a lower frequency that is raised until DC link 130 is charged. In some implementations, the initial switching frequency is based on the charge level of traction battery 150. For example, a lower voltage of traction battery 150 naturally generates less in-rush current, and so DC link 130 can be charged more quickly. In some implementations, the initial switching frequency is a single, defined frequency.

In some implementations, the switches have the same duty cycle (for example, on-times of 40%, 50%, or 60%) but are offset by a constant phase (for example, 10, 20, 30, 40, 50, 60, 70, 90, 100, 110, 120, etc. degrees). For example, at FIG. 3, switches Q1 and Q3 are phase shifted by 90 degrees and have a 50% duty cycle, and switches Q2 and Q4 are 180 degrees phase shifted with respect to Q1 and Q3. A higher phase difference between switches Q1 and Q3 allows for faster charging of DC link 130 and is adjusted according to the ability of the components to tolerate in-rush current. Activating Q1 and Q3 allows a voltage pulse to travel across bidirectional DC-DC converter 140. At FIG. 3, a voltage pulse (VTR) is formed when Q1 and Q3 are switched on but do not overlap. The VTR charges DC link 130. A larger phase shift between Q1 and Q3 causes a larger voltage pulse across the transformers of bidirectional DC-DC converter 140, which enables faster charging of DC link 130.

Once DC link 130 has reached a threshold level of charge, or after the switches have been held at the initial frequency for a specified period of time, the switching frequency is adjusted by controller 160b to a lower frequency to allow DC link 130 to reach a second threshold level of charge. The frequency is gradually adjusted (lowered) via controller 160b until DC link 130 is fully charged and power can be delivered from AC port 110 without in-rush current. The final charge level of DC link 130 may depend on the expected power and voltage from AC port 110 (for example 110V, 120V, 220V, 240V). The frequency sweep is dependent on the level of in-rush current that can be tolerated by the components of system 100 while charging DC link 130. The frequency progression may be determined by simulation and varies based on the application of system 100 and the specific components and their respective tolerances used to form system 100. Controller 160a may reference a look-up table to determine the correct frequencies and the duration that the switching frequency should be held at a specific frequency.

Figure 4:
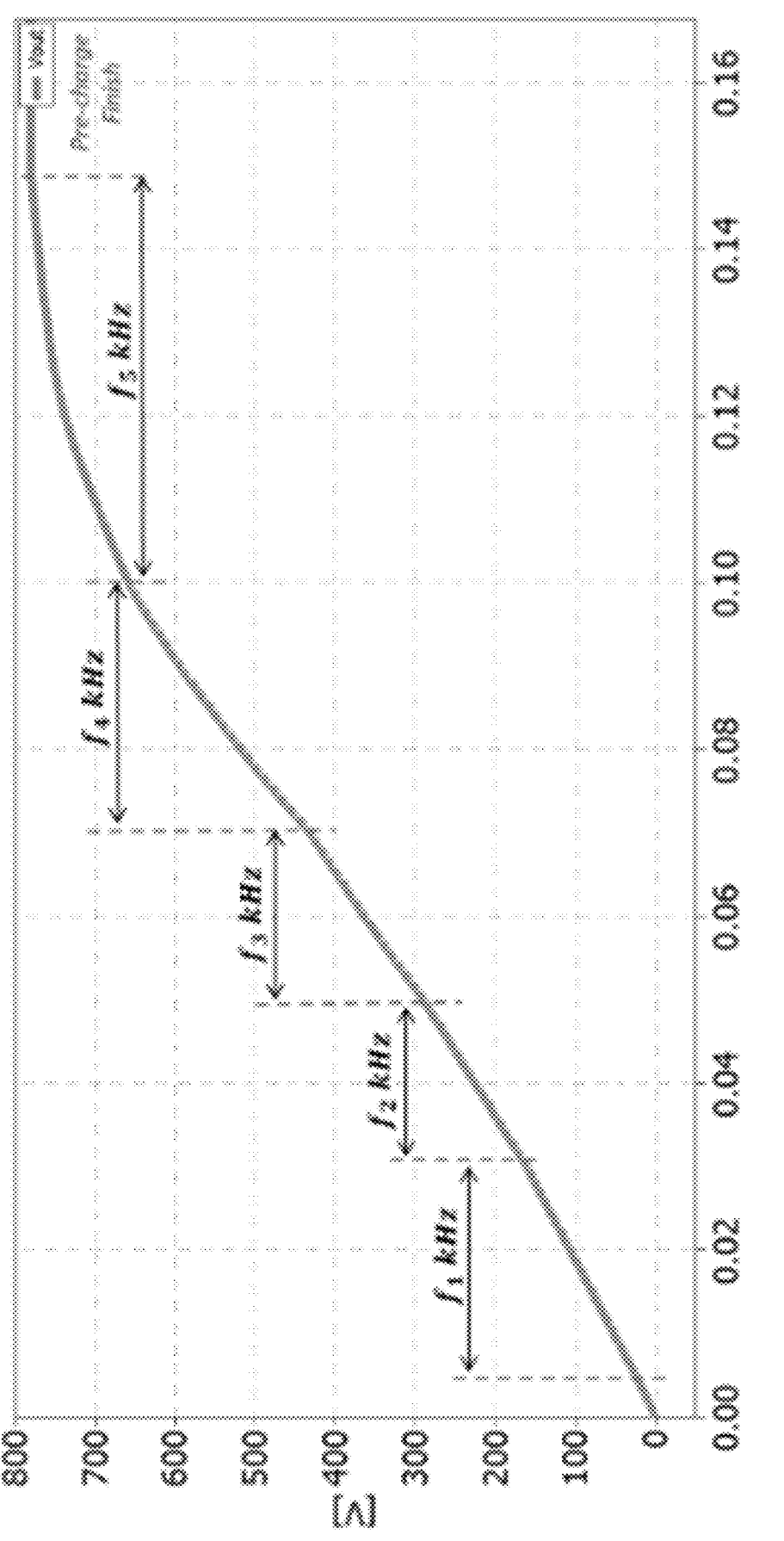

FIG. 4 is an example frequency sweep diagram. The switching frequency applied to the switches of bidirectional DC-DC converter 140 is gradually adjusted (raised or lowered depending on the implementation) resulting in a gradually increased voltage charge of DC link 130.

Phase Shift Adjustment

Figure 5A:
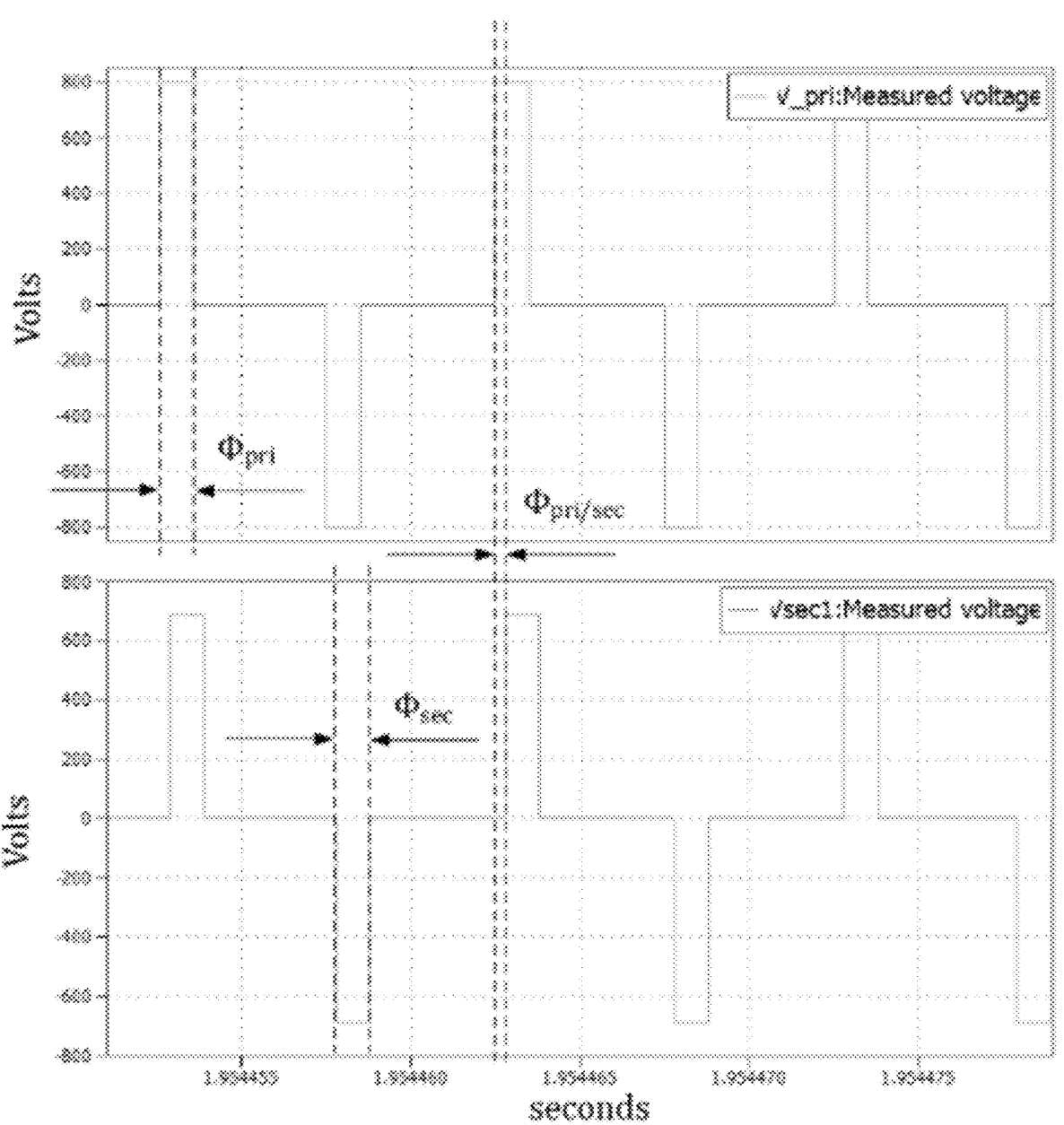

FIG. 5A is an example voltage diagram for an example method of charging DC link 130. In some implementations, DC link 130 is charged by adjusting a phase shift ($\Phi_{pri/sec}$) between a primary bridge and a secondary bridge of the transformers of bidirectional DC-DC converter 140. Controller 160a signals controller 160b to switch the switches of the primary bridge and secondary bridge of the transformers at a constant frequency while adjusting $\Phi_{pri/sec}$.

Figure 5B:
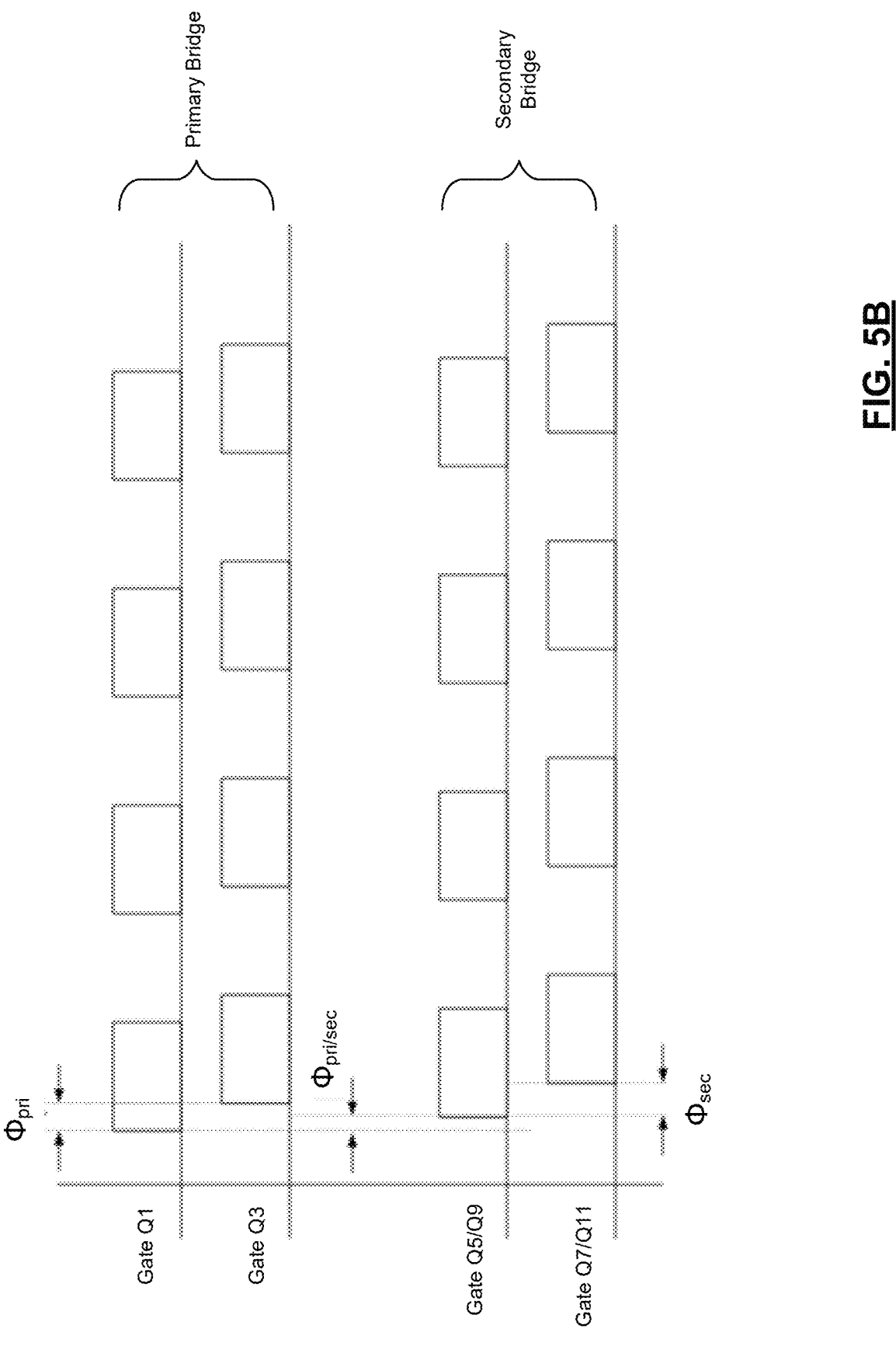

In FIG. 5B, within the primary bridge of the transformers, a first set of switches have a phase shift ($\Phi_{pri}$) with respect to a second set of switches in the transformer. Within the secondary bridge of the transformers, a third set of switches have a phase shift ($\Phi_{sec}$) from a fourth set of switches. The phase shift between the rising edge of the earliest primary switch duty cycle and the rising edge of the earliest second switch duty cycle is $\Phi_{pri/sec}$. In various implementations, $\Phi_{pri}$ and $\Phi_{sec}$ are held constant and only $\Phi_{pri/sec}$ is adjusted. In various implementations, $\Phi_{pri/sec}$ is started at zero, and then is linearly increased until $\Phi_{pri/sec}$ is greater than the phase shift of the primary bridge ($\Phi_{pri}$) or the secondary bridge ($\Phi_{sec}$), at which point maximum power transfer is achieved. As described with respect to FIG. 3, gradually adjusting the phase shift between the primary and secondary bridges of system 100 charges DC link 130 to a threshold voltage while mitigating in-rush current from the traction battery 150. Charging DC link 130 reduces in-rush current from AC port 110 when initially charging traction battery 150.

Figure 6:
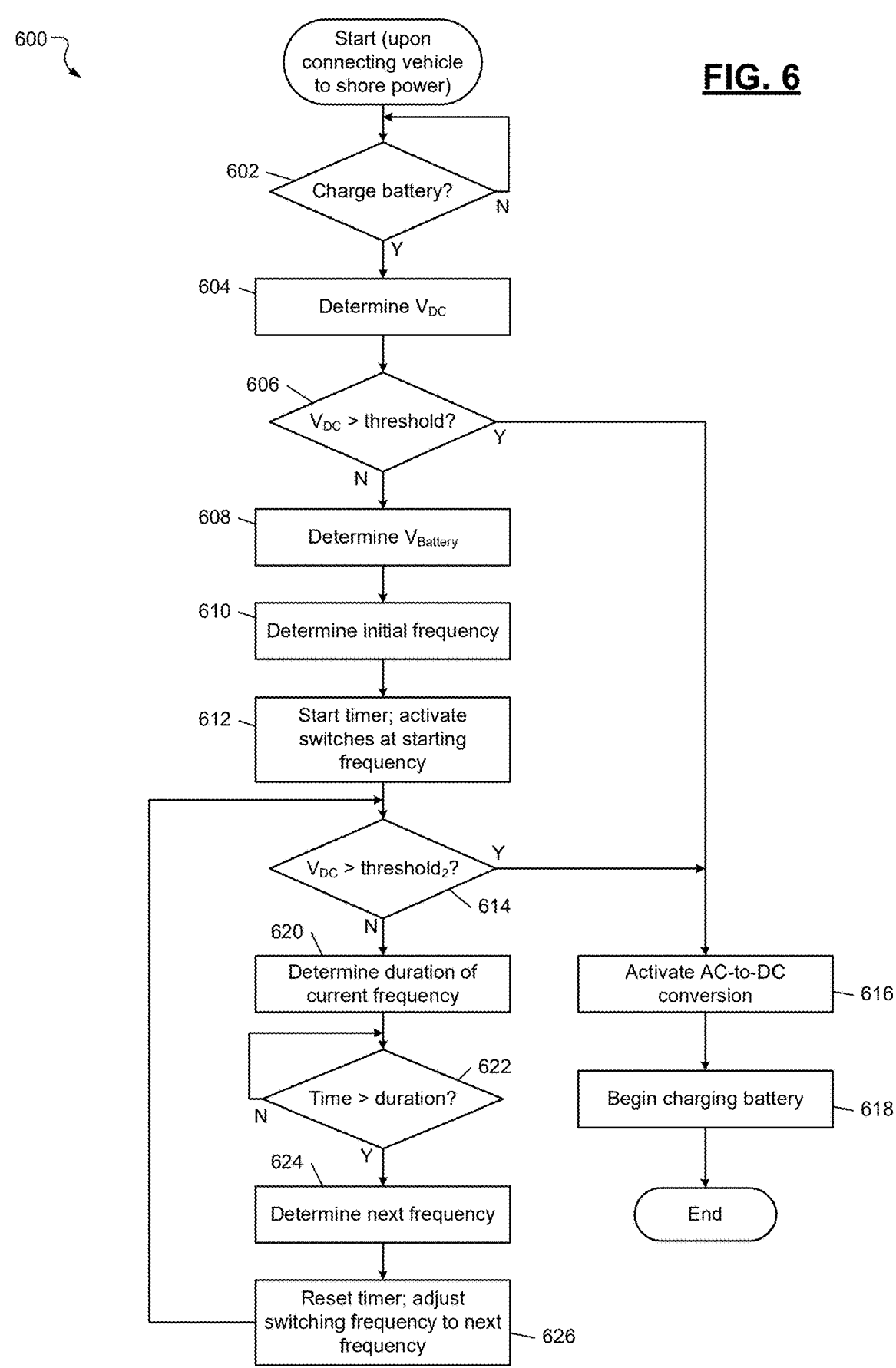
FIG. 6 is a flowchart illustrating an example startup operation using frequency adjustment.

FIG. 6 is a flowchart of example method 600 for charging traction battery 150 with switching-frequency-based precharging. In various implementations, control of method 600 may be performed by one or more of supervisory controller 160a, controller 160b and/or controller 160c. Method 600 begins at 602 when system 100 is connected to shore power. For example, shore power may include an AC device or AC power source connected to AC port 110. The AC power source may include a charging station or a receptacle at a residence or business.

At 602, control determines whether charging of traction battery 150 is requested; if so, control transfers to 604; otherwise, control remains at 602. For example, the request to charge traction battery 150 may be generated by controller 160a based on a voltage of traction battery 150 being below a threshold voltage. The request to charge traction battery 150 may be based on additional factors, such as manual driver input or a charging schedule, which may be determined based on driving patterns and energy costs at different times of day.

At 604, control determines the present voltage of DC link 130. For example, the present voltage may be directly measured, inferred from other measurements, and/or received from a sensing device. At 606, if the voltage of DC link 130 is greater than a threshold voltage, control continues to 616. At 616, control initiates AC-to-DC conversion, such as by activating bidirectional DC-DC converter 140. Either immediately or after a delay following initiation of AC-to-DC conversion, control continues to 618. The delay may be a specified period of time or may vary based on voltage; for example, the delay may be based on a length of time until the voltage of DC link 130 reaches a second threshold. At 618, traction battery 150 begins charging from DC link 130 (for example, via bidirectional DC-DC converter 140) and control ends.

At 606, if the voltage of DC link 130 is not greater than the threshold voltage, control moves to 608. At 608, control determines the voltage of traction battery 150. For example, the voltage of traction battery 150 may be directly measured, inferred from other measurements, and/or received from a sensing device. At 610, control determines an initial switching frequency to use in controlling the switches of bidirectional DC-DC converter 140. For example, the initial switching frequency may be based on the voltage of traction battery 150. For example, the initial switching frequency may also be based on an incoming AC voltage.

At 612, control commands the switches of bidirectional DC-DC converter 140 to begin switching (on and off) at the initial switching frequency. For example, control may instruct controller 160c to drive control terminals (such as gate terminals or base terminals) of the switches at the initial switching frequency. Control also starts a duration timer.

At 614, if the voltage of DC link 130 is greater than a secondary threshold voltage, control moves to 616, which is described above; otherwise, control moves to 620.

At 620, control determines a duration for holding the switches at the current switching frequency. Control continues to 622 and remains at 622 until the present switching frequency has been maintained for the determined duration. If, at 622, the current switching frequency has been held for the determined duration, control moves to 624. At 624, control determines the next switching frequency. For example, control may reference a look-up table to determine the next switching frequency. At 626, control adjusts the switching frequency to the next switching frequency and control resets the duration timer. After 626, control returns to 614.

Figure 7:
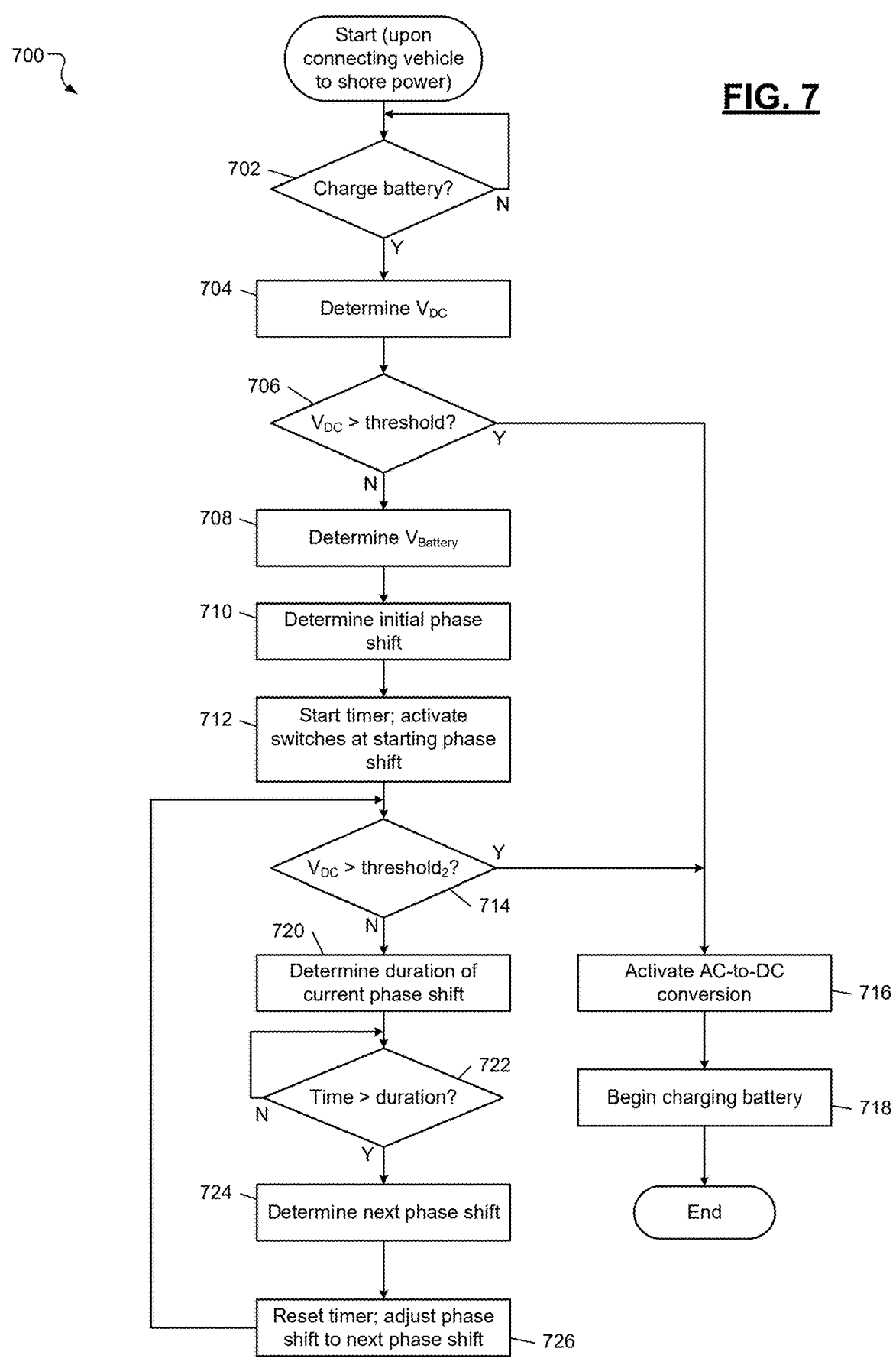
FIG. 7 is a flowchart illustrating an example startup operation using phase adjustment.

FIG. 7 is a flowchart of example method 700 for charging traction battery 150 with phase-shift-based precharging. Elements 702, 704, 706, 708, 714, 716, and 718 of method 700 may be implemented similarly or identically to elements 602, 604, 606, 608, 614, 616, and 618 of method 600, respectively. In various implementations, elements 710, 712, 720, and 724 may differ from corresponding elements of method 600 and so are described below.

At 710, control determines an initial phase shift of the switches of bidirectional DC-DC converter 140.

At 712, control commands the switches of bidirectional DC-DC converter 140 to begin switching (on and off) with an initial phase shift. For example, control may instruct controller 160c to drive control terminals (such as gate terminals or base terminals) of the switches at the initial phase shift. Control also resets a duration timer.

At 720, control determines the duration to hold switches at the current phase shift. Control continues to 722 and remains at 722 until the present phase shift has been maintained for the required duration, at which point control moves to 724. At 724, control determines the next phase shift adjustment. For example, control may instruct controller 160a and/or controller 160c to reference a look-up table to determine the next phase shift. At 726, control adjusts the phase shift to the determined phase shift and control resets the duration timer. After 726, control returns to 714.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code coupled with memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special purpose computer created by configuring a general purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system comprising:

a direct current (DC) link configured to receive DC power from a first converter that converts alternating current (AC) power into the DC power;

a bidirectional DC-DC converter electrically connected between the DC link and a DC power source, wherein:

the bidirectional DC-DC converter is configured to convert the DC power from a first voltage to a second voltage, and the bidirectional DC-DC converter includes a plurality of switches; and a controller configured to control a switching parameter of the plurality of switches to charge the DC link to a threshold voltage from the DC power source before the first converter provides power to the DC power source, wherein the switching parameter is a switching frequency, and wherein controlling the switching parameter includes:

initially setting the switching parameter to a first value, and in response to determining that a set of criteria has been met:

adjusting the switching parameter to a second value that is less than the first value, while holding constant a phase shift between a first set of switches of the plurality of switches and a second set of switches of the plurality of switches.

2. The system of claim 1 wherein:

switching of the first set of switches of the plurality of switches is phased shifted with respect to switching of the second set of switches of the plurality of switches.

3. The system of claim 1 wherein the switching parameter is iteratively adjusted by a plurality of increments.

4. The system of claim 3 wherein the switching parameter is adjusted monotonically.

5. The system of claim 1 wherein:

a duty cycle of each switch of the plurality of switches remains unchanged while the switching parameter is being adjusted; and the duty cycle of each switch of the plurality of switches is equal to each other.

6. The system of claim 1 wherein:

a first group of switches of the plurality of switches has a first duty cycle;

a second group of switches of the plurality of switches has a second duty cycle;

a sum of the first duty cycle and the second duty cycle is one hundred percent; and the first duty cycle and the second duty cycle are held constant while the switching parameter is adjusted.

7. The system of claim 1 wherein the set of criteria includes a criterion that is met by the DC link exceeding a first capacitor voltage.

8. The system of claim 1 wherein the set of criteria includes a criterion that is met by a specified first time period elapsing.

9. The system of claim 1 wherein the DC power source is configured to, in a reverse operating mode, deliver power to an AC power source.

10. The system of claim 1 further comprising:

a system controller configured to delay provision of power from the first converter to the DC link until the DC link is charged to the threshold voltage, wherein the system controller is configured to selectively charge the DC power source from power provided by the first converter.

11. The system of claim 1 wherein the controller is configured to repeatedly adjust the switching parameter until at least one of:

a voltage of the DC link reaches a voltage threshold;

a time since initially setting the switching parameter to the first value reaches a threshold; or the switching parameter is adjusted to a final switching parameter.

12. The system of claim 11 wherein:

the final switching parameter is determined by indexing a lookup table; and the lookup table is indexed by a measured voltage of the DC power source.

13. The system of claim 1 wherein:

the first value is determined by indexing a lookup table; and the lookup table is indexed by a measured voltage of the DC power source.

14. The system of claim 1 further comprising:

the first converter, wherein the first converter is a bidirectional power factor correction (PFC) inverter.

15. The system of claim 1 wherein the DC link includes a set of capacitors electrically arranged in parallel.

16. The system of claim 1 wherein:

the bidirectional DC-DC converter includes a set of transformers, a first side of the set of transformers is electrically arranged in series, a second side of the set of transformers is electrically arranged in parallel, and the bidirectional DC-DC converter has inductive-capacitive and capacitive-inductive resonance.

17. The system of claim 1 further comprising:

the DC power source, wherein the DC power source includes a battery bank.

* * * * *